United States Patent
Chen et al.

(10) Patent No.: US 9,967,773 B2
(45) Date of Patent: May 8, 2018

(54) PADDING IN HIGH-EFFICIENCY SIGNAL B IN A HIGH EFFICIENCY WIRELESS LOCAL AREA NETWORKS

(71) Applicant: Intel IP Corporation, Santa Clara, CA (US)

(72) Inventors: Xiaogang Chen, Beijing (CN); Qinghua Li, San Ramon, CA (US); Yuan Zhu, Beijing (CN); Yushu Zhang, Beijing (CN); Huaning Niu, Milpitas, CA (US)

(73) Assignee: Intel IP Corporation, Santa Clara, CA (US)

( * ) Notice: Subject to any disclaimer, the term of this patent is extended or adjusted under 35 U.S.C. 154(b) by 119 days.

(21) Appl. No.: 14/972,890

(22) Filed: Dec. 17, 2015

(65) Prior Publication Data
US 2017/0105140 A1    Apr. 13, 2017

Related U.S. Application Data

(60) Provisional application No. 62/238,829, filed on Oct. 8, 2015.

(51) Int. Cl.
*H04W 28/06* (2009.01)
*H04L 1/00* (2006.01)

(52) U.S. Cl.
CPC .............. *H04W 28/06* (2013.01); *H04L 1/00* (2013.01)

(58) Field of Classification Search
None
See application file for complete search history.

(56) References Cited

U.S. PATENT DOCUMENTS

| | | | |
|---|---|---|---|
| 2014/0307650 A1* | 10/2014 | Vermani | H04L 5/0044 370/329 |
| 2016/0204912 A1* | 7/2016 | Sun | H04L 27/2613 375/302 |
| 2016/0285608 A1* | 9/2016 | Kwon | H04L 5/0055 |
| 2017/0006608 A1* | 1/2017 | Josiam | H04W 72/0453 |
| 2017/0064718 A1* | 3/2017 | Bharadwaj | H04W 72/0493 |
| 2017/0094664 A1* | 3/2017 | Lee | H04B 7/0452 |

\* cited by examiner

*Primary Examiner* — Saba Tsegaye
(74) *Attorney, Agent, or Firm* — Schwegman Lundberg & Woessner, P.A.

(57) ABSTRACT

Methods, computer readable media, and apparatuses for padding and decoding coding for a HE-SIG-B field are disclosed. An apparatus of an access point or station is disclosed. The apparatus is configured to determine a number of symbols of a longest high-efficiency signal B (HE-SIG-B) field of a plurality of HE-SIG-B fields. The processing circuitry may be further configured to encode a plurality of HE-SIG A fields to comprise a number of symbols of a longest HE-SIG-B field of the plurality of HE-SIG-B fields each HE-SIG-A field. The processing circuitry may be further configured to encode each of the HE-SIG-B fields of the plurality of HE-SIG-B fields to comprise a common block and a number of user blocks, and if a number of symbols to encode the common block and the number of user blocks is less than the number of symbols of the longest HE-SIG-B field, encode a duplicate portion.

20 Claims, 10 Drawing Sheets

PADDING IN HIGH-EFFICIENCY SIGNAL B IN A HIGH EFFICIENCY WIRELESS LOCAL AREA NETWORKS

PRIORITY CLAIM

This application claims the benefit of priority under 35 U.S.C. 119(e) to U.S. Provisional Patent Application Ser. No. 62/238,829, filed Oct. 8, 2015, which is incorporated herein by reference in their entirety.

TECHNICAL FIELD

Embodiments pertain to wireless communications in a wireless local-area network (WLAN). Some embodiments relate to coding, sending, receiving, and decoding a signal B (SIG-B) field with a portion duplicated. Some embodiments relate to Institute of Electrical and Electronic Engineers (IEEE) 802.11 and some embodiments relate to IEEE 802.11ax. Some embodiments relate to Unifi.

BACKGROUND

Users of wireless networks often demand more bandwidth and faster response times. However, the available bandwidth may be limited. Moreover, there are more and more wireless devices operating close to one another. Additionally, it takes resources to repeat a packet. Moreover, wireless devices may operate with different communication standards.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
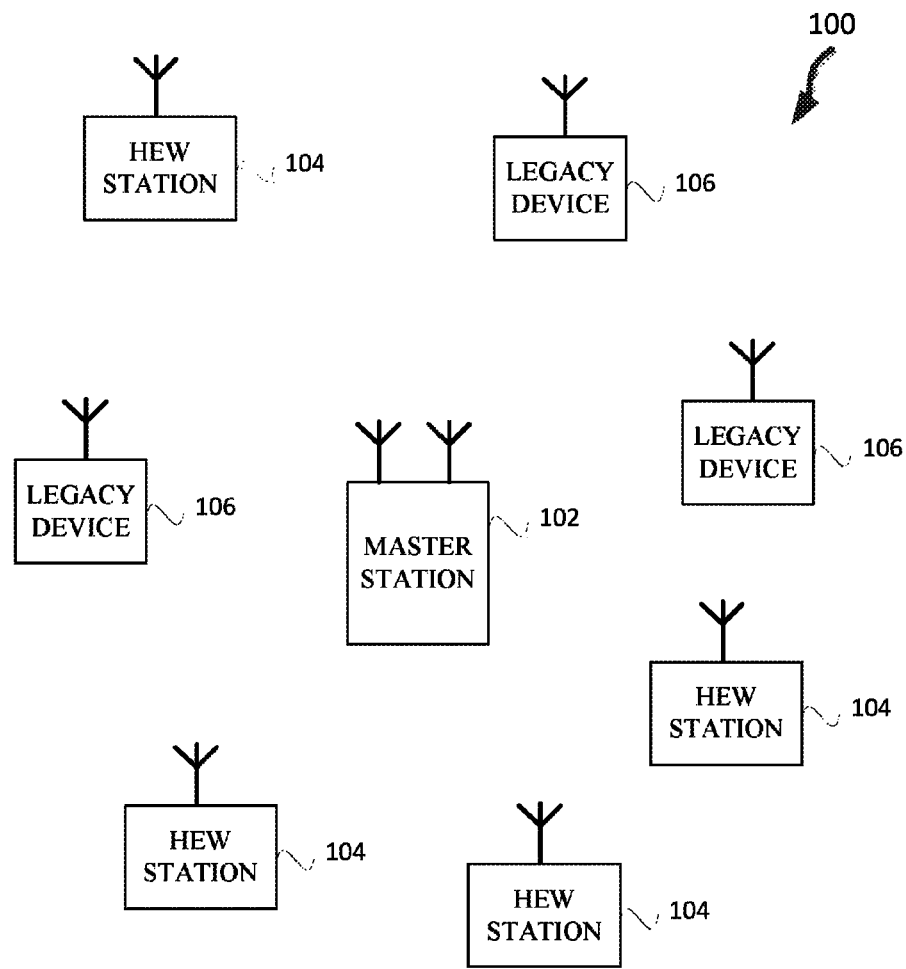
FIG. 1 illustrates a WLAN in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.1 lax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-10.

Figure 2:
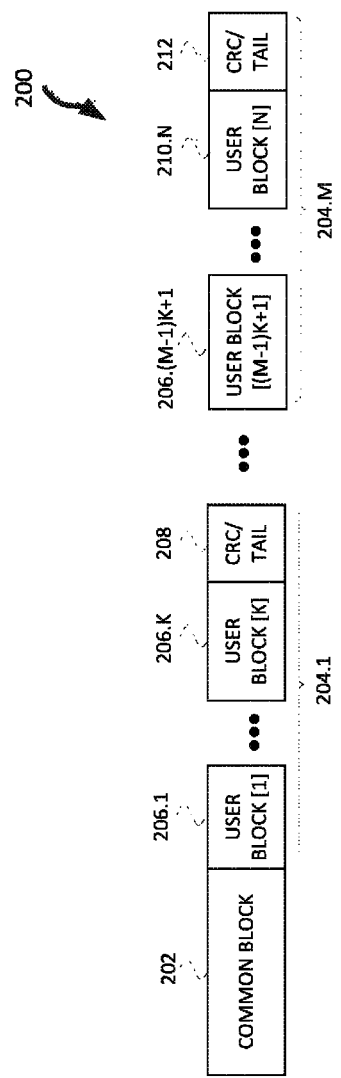
FIG. 2 illustrates a HE-SIG-B in accordance with some embodiments.

FIG. 2 illustrates a HE-SIG-B 200 in accordance with some embodiments. Illustrated in FIG. 2 is a common block 202, and one or more binary convolutional coding (BCC) blocks 204. Each BCC block 204 includes one or more user blocks 206 that are encoded together and include a cyclic redundancy code (CRC) or tail 208. The user blocks 206 include information for a resource allocation for a station. The BCC blocks 206 may each include k user blocks 206, but the last BCC block 206.M may not include the full k user blocks because k may not divide the number of user blocks 206 equally. The common block 202 may comprise information that is common to the user blocks 206. The number of symbols of the HE-SIG-B 200 may be indicated by a HE-SIG-A (not illustrated) prior to the HE-SIG-B 200. A HE-SIG-A may also indicate the modulation and coding scheme (MCS) of the HE-SIG-B.

The user blocks 206 and the common field 202 as well as a HE SIG A, together describe the frames that are going to be transmitted after the HE-SIG-B. The user blocks 206 may include an indication of a duration and a sub-channel for a station.

Figure 3:
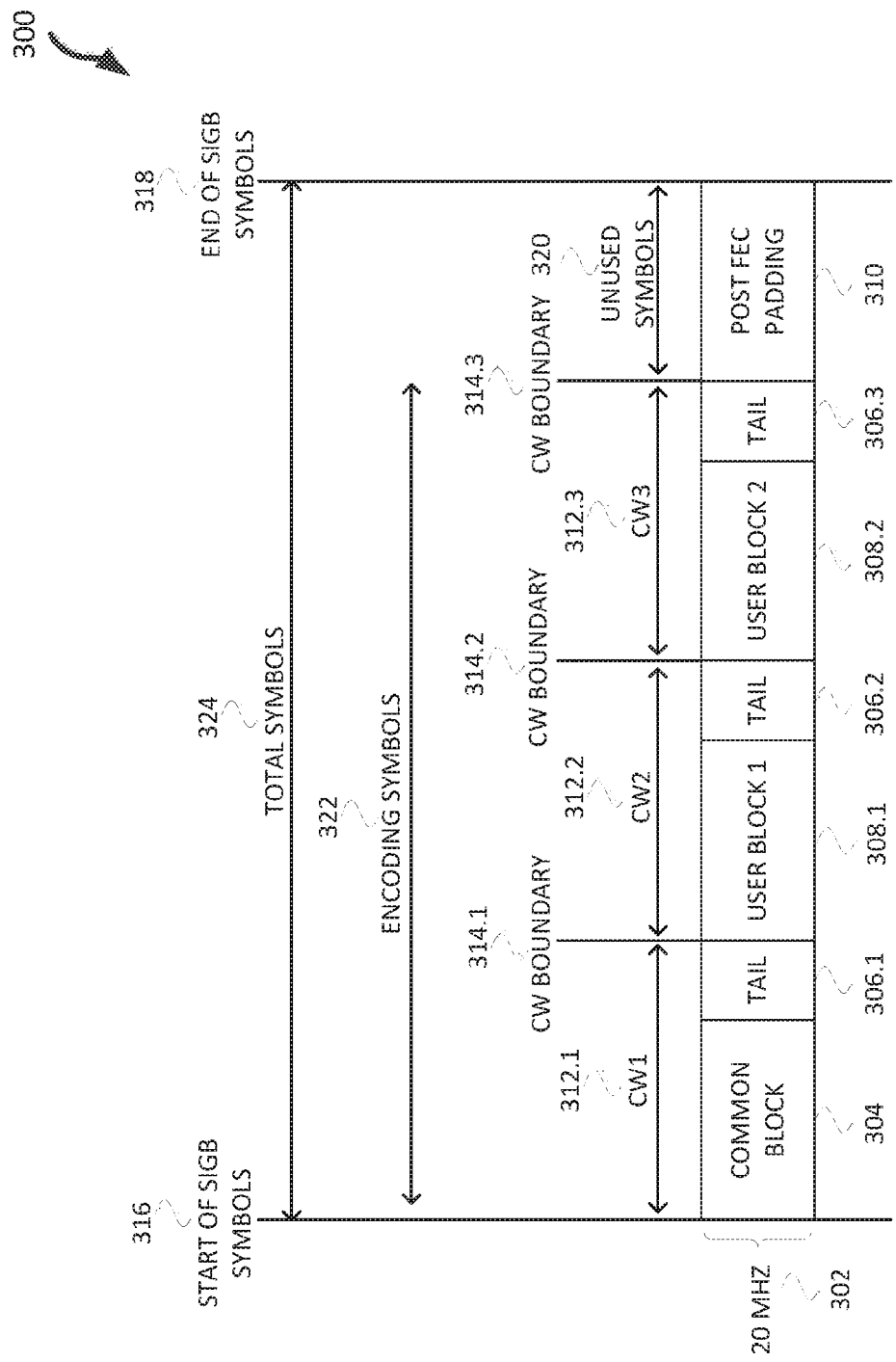
FIG. 3 illustrates a HE-SIG-B in accordance with some embodiments.

FIG. 3 illustrates a HE-SIG-B 300 in accordance with some embodiments. Illustrated in FIG. 3 is a 20 MHz bandwidth sub-channel 302 along a vertical axis and a start of SIGB symbols 316 and end of SIGB symbols 318 along the horizontal axis. Illustrated in FIG. 3 are three code words (CW), CW1 312.1, CW2 312.2, and CW3 312.3. Each code word 312 is information that is encoded together into one or more symbols. Each code word 312 includes a tail 306, which may be a CRC. The code words 312 are separated by CW boundaries 314. The HE-SIG-B 300 may include the common block 304, user block 1 308.1, user block 2 308.2, and post forward error correction (FEC) padding 310. User block 1 308.1 and user block 2 308.2 may include one or more user blocks that include information for a station regarding a resource allocation. There may be only one user block 308 or there may be two or more user blocks 308.

The total symbols 324 is the length of the HE-SIG-B 300, which may be given by a preceding HE-SIG-A. The total symbols 324 may be determined by another HE-SIG-B (not illustrated) that may be transmitted on a different 20 MHz 302 sub-channel. The encoding symbols 322 is the number symbols needed to encode the common block 304 and the user blocks 308. The unused symbols 320 is the difference between the total symbols 324 and the encoding symbols 322. The unused symbols 320 may include a partial symbol, which may be a number of tones or sub-carriers. The post FEC padding 310 uses the unused symbols 320 for error correcting the encoding symbols 322.

Figure 4:
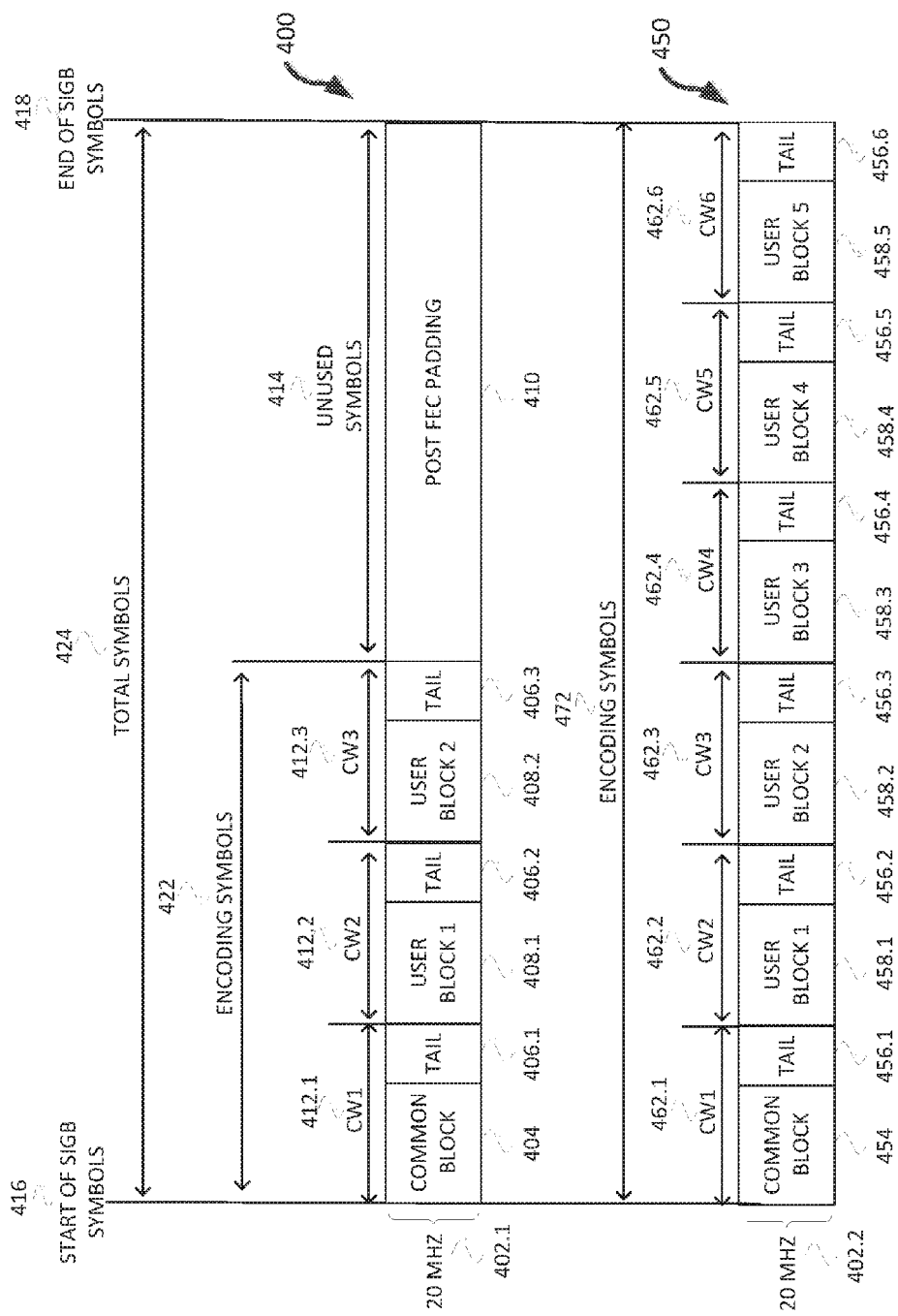
FIG. 4 illustrates a HE-SIG-A in accordance with some embodiments.

FIG. 4 illustrates a HE-SIG-A 400 in accordance with some embodiments. Illustrated in FIG. 4 are two 20 MHz bandwidth sub-channels 402.1, 402.2 along a vertical axis and a start of SIGB symbols 416 and end of SIGB symbols 418 along the horizontal axis.

HE-SIG-B 450 includes five CWs 462. CW1 462.1 is a common block 454 with a tail 456.1. CW2 462.2, CW3 462.3, CW4 462.4, CW5 462.5, and CW6 462.6 are each a user block 458 and tail 456. HE-SIG-B 450 is for more stations than HE-SIG-B 400. HE-SIG-B 450 is encoding symbols 472 long.

HE-SIG-B 400 includes three CWs 412. CW1 412.1 is a common block 404 with a tail 406.1. CW2 412.2 and CW3 412.3 are each a user block 408 and tail 406. HE-SIG-B 400 is for fewer stations than HE-SIG-B 450. HE-SIG-B 400 is encoding symbols 422 long plus unused symbols 414.

The master station 102 may be configured to transmit HE-SIG-B 400 and HE-SIG-B 450 simultaneously on different 20 MHz bandwidth sub-channels 402.1, 402.2. The master station 102 may transmit a HE-SIG-A (not illustrated) prior to the HE-SIG-Bs 400, 450 with a length indication of total symbols 424 that indicates the HE-SIG-Bs 400, 450 will be have a duration of total symbols 424. HE-SIG-B 400 has unused symbols 412.1 to encode post FEC padding 408.1.

In some embodiments, HE-SIG-B 450 includes a duplicated common block 454 at the end of the HE-SIG-B 450.

Figure 5:
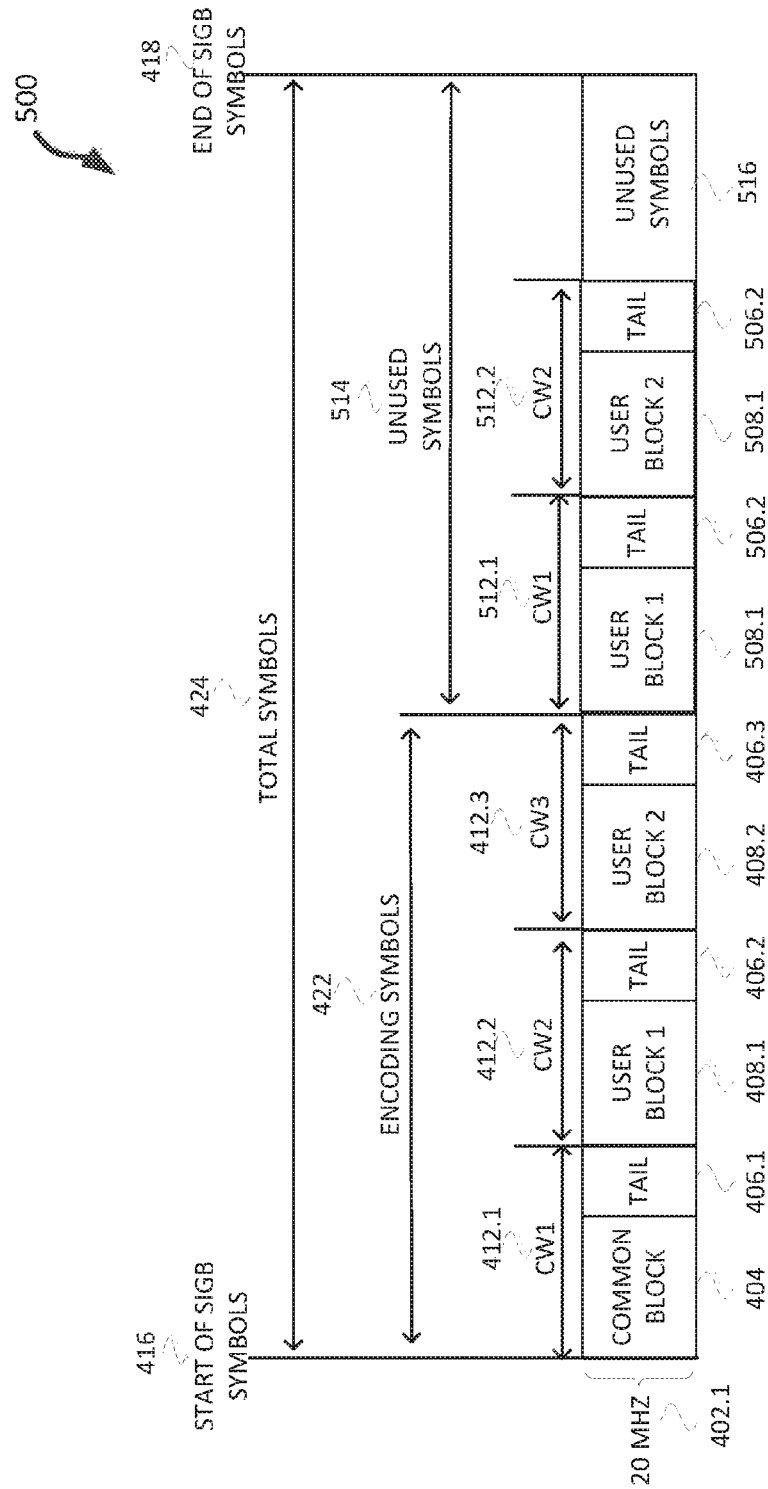
FIG. 5 illustrates the HE-SIG-B of FIG. 4 in accordance with some embodiments.

FIG. 5 illustrates the HE-SIG-B of FIG. 4 in accordance with some embodiments. Illustrated in FIG. 5 is HE-SIG-B with the unused symbols 514 being filled with repetitions of CWs 412. In the example of FIG. 5, user block 1 408.1, tail 406.2, user block 2 408.1, and tail 406.2 are duplicated as user block 1 508.1, tail 506.2, user block 2 508.1, and tail 506.2, respectively, or CW1 512.1, CW2 512.2, respectively. There may still be unused symbols 516 in accordance with some embodiments. In some embodiments the common block 404 and tail 406.1 may be copied in the unused symbols 514. In some embodiments there are no unused symbols 516. In some embodiments, the duplicated user block 1 508.1, tail 506.2, user block 2 508.1, tail 506.2 may be in a different order. For example, they may be reversed. In some embodiments, a CWs 512 may be partially duplicated to fill the unused symbols 516.

Figure 6:
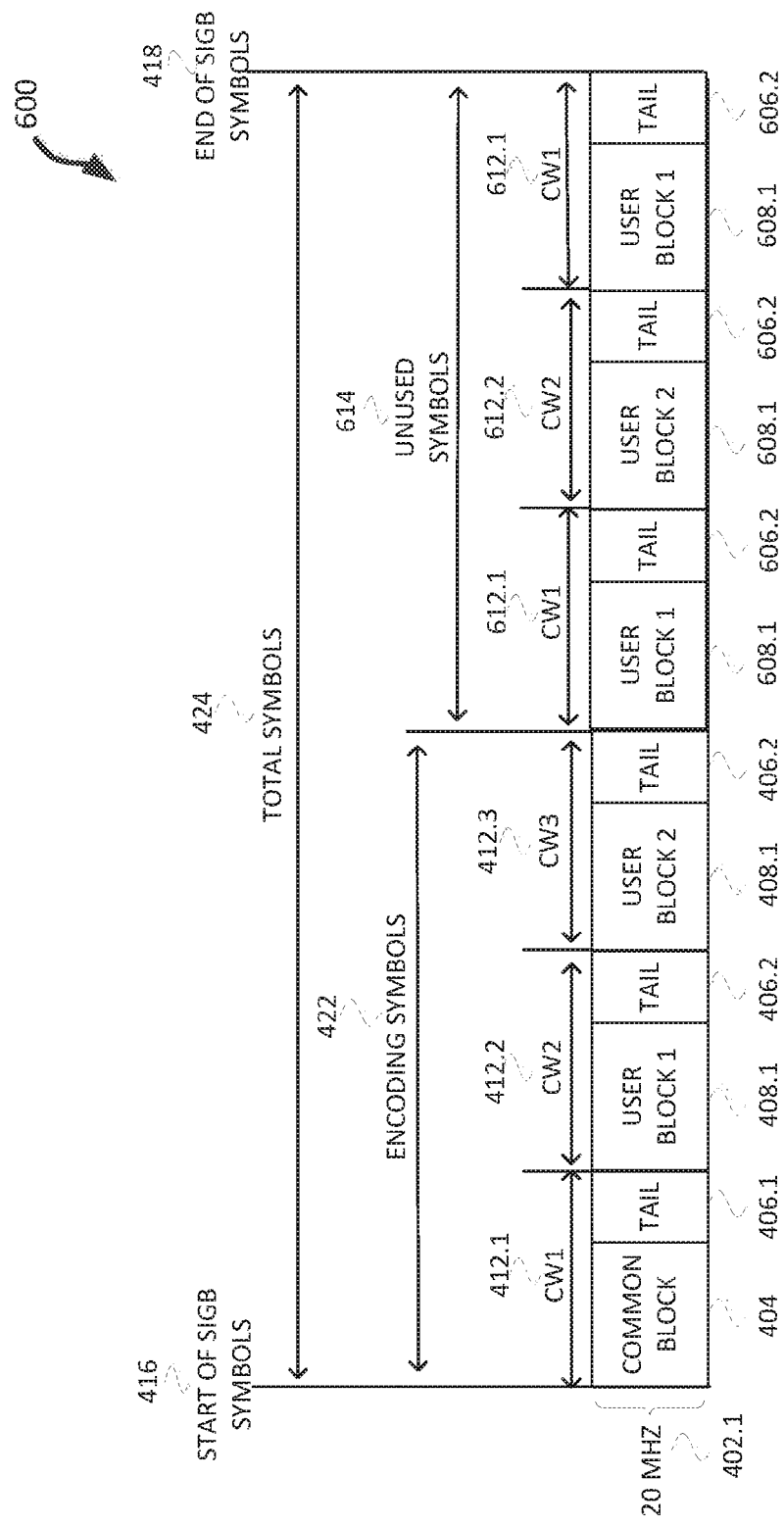
FIG. 6 illustrates the HE-SIG-B of FIG. 4 in accordance with some embodiments.

FIG. 6 illustrates the HE-SIG-B of FIG. 4 in accordance with some embodiments. Illustrated in FIG. 6 is HE-SIG-B with the unused symbols 614 being filled with repetitions of CWs 412. In the example of FIG. 6, user block 1 408.1, tail 406.2, user block 2 408.1, and tail 406.2 are duplicated as user block 1 608.1, tail 606.2, user block 2 608.1, and tail 606.2, respectively, or CW1 612.1, CW2 612.2, respectively. User block 1 408.1 and tail 406.2 are then repeated as user block 1 608.1 and tail 606.2, respectively, which is equivalent to CW2 412.2 is repeated as CW1 612.1. The length of the CWs 412 may be different. Because the common block 404 is usually shorter than the user block 1 408, CW1 412 is usually shorter than the CWs 412 that include a user block 408.

The HEW station 104 and/or master station 102 of the HE-SIG-B 400, 500, 600 may combine the duplicated information or CWs to enhance the detection performance. The HEW station 104 and/or master station 102 may be configured to combine individual bits together to get bit level combination.

Figure 7:
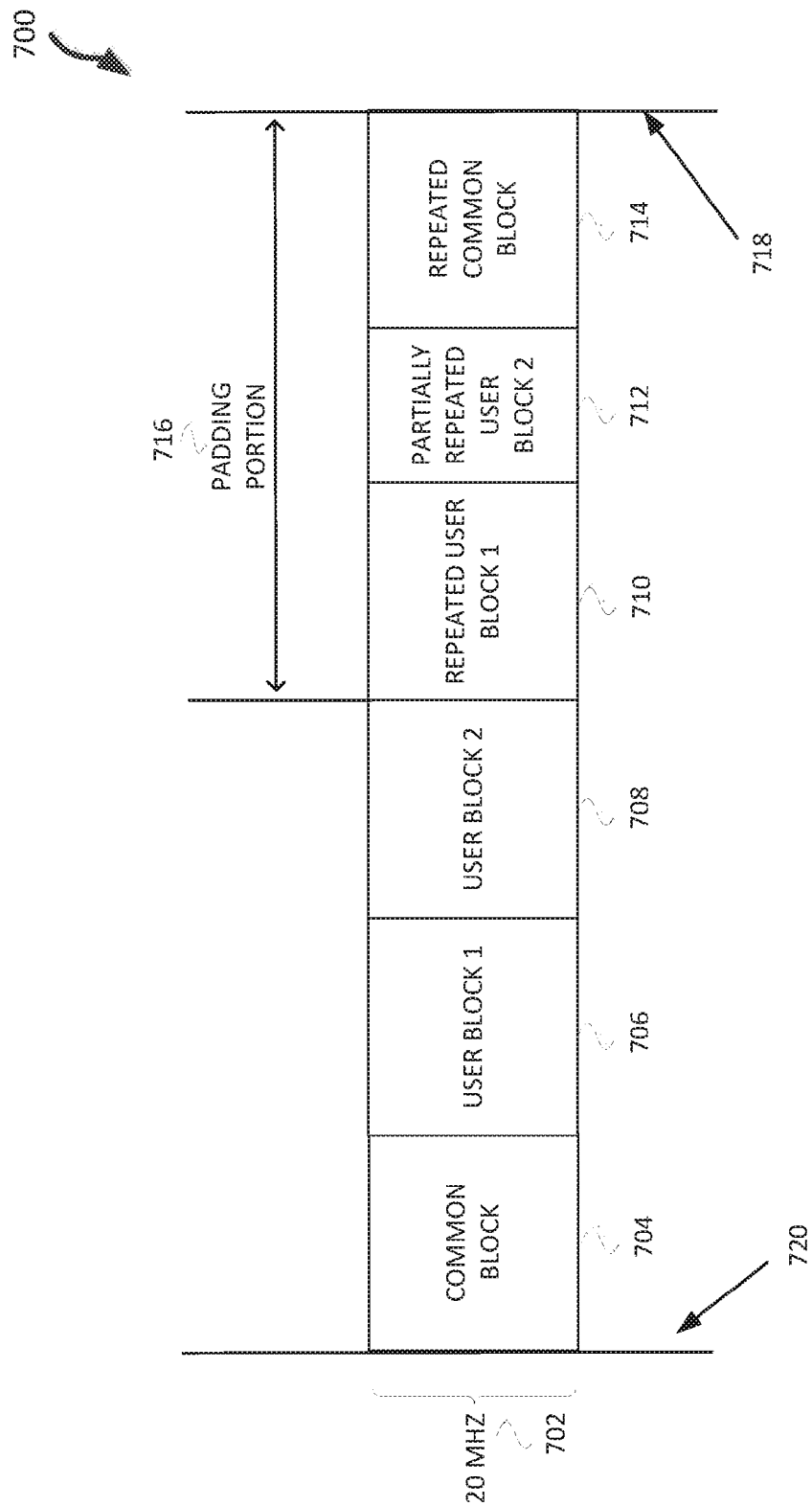
FIG. 7 illustrates a HE-SIG-B in accordance with some embodiments.

FIG. 7 illustrates a HE-SIG-B 700 in accordance with some embodiments. Illustrated in FIG. 7 is a 20 MHz bandwidth sub-channel 702 along a vertical axis and a start of symbols 720 with an end of symbols 718. The HE-SIG-B 700 comprises a common block 704, user block 1 706, user block 2 708, repeated user block 1 710, partially repeated user block 2 712, and repeated common block 714. The repeated user block 1 710, partially repeated user block 2 712, and repeated common block 714 are part of a padding portion 716 where information from the first portion is duplicated. In some embodiments, the master station 102 and/or HEW device 104 receive a number of symbols of the HE-SIG-B 700 in a HE-SIG-A that is transmitted to the master station 102 and/or HEW device 104 before the HE-SIG-B 700. The master station 102 and/or HEW device 104 may not receive the common block 704, but may determine where the end of symbols 718 is and work backwards to determine the repeated common block 714. The master station 102 and/or HEW device 104 may decode the repeated common block 714 if the reception of the common block 704 fails. In some embodiments, the master station 102 and/or HEW device 104 may combine the bits of the common block 704 with the repeated common block 714 to improve the reception of the common block 704. In some embodiments, the repeated common block 714 may be reversed with the first portion at the end of the padding portion 716.

Figure 8:
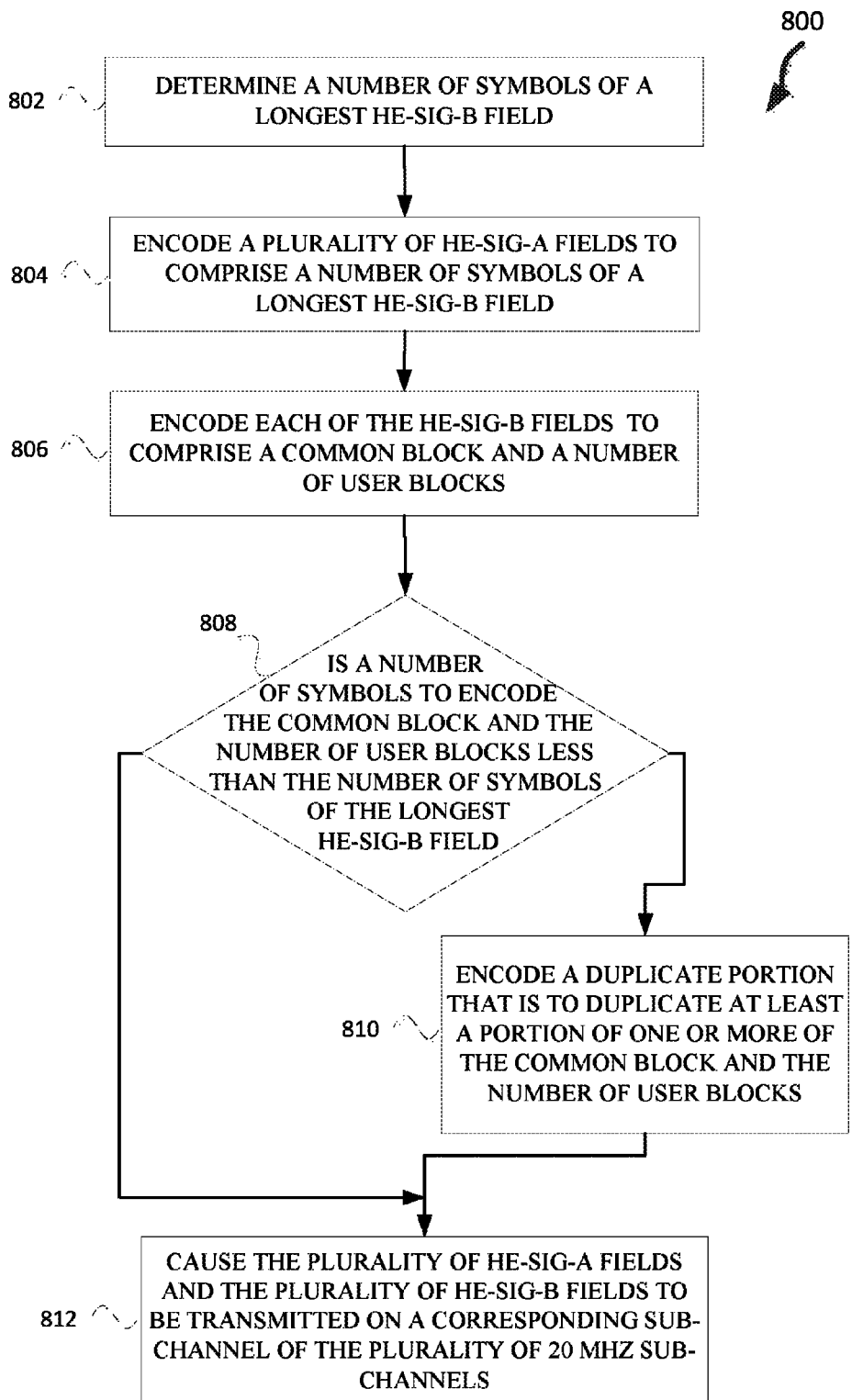
FIG. 8 illustrates a method for padding in HE-SIG-Bs in accordance with some embodiments.

FIG. 8 illustrates a method 800 for padding in HE-SIG-Bs in accordance with some embodiments. The method 800 begins at operation 802 with determining a number of symbols of a longest HE-SIG-FIELD. For example, a master station 102 may be configured to determine the number of symbols (encoding symbols 472) of HE-SIG-B 450 of FIG. 4. The method 800 continues at operation 804 with encoding the plurality of HE-SIG-A fields to comprise the number of symbols of a longest HE-SIG-B field. For example, the master station 102 may encode HE-SIG-B fields 400 and 450. There may be one HE-SIG-B field for each of a plurality of 20 MHz sub-channels. The HE-SIG-B fields may be sent as part of a transmission opportunity for downlink data. The method 800 continues at operation 806 with encoding each of the HE-SIG-B fields to comprise a common block and a number of user blocks. For example, the master station 102 may encode the HE-SIG-B fields 200, 300, 400, 450, 500, 600, 700 in accordance with FIGS. 2-7 and the accompanying description.

The method 800 continues at operation 808 with is a number of symbols to encode the common block and the number of user blocks less than the number of symbols of the longest HE-SIG-B field. For example, for HE-SIG-B 400, the number of symbols to encode the common block 404 and the user blocks 408 is less than the number of encoding symbols 472. For HE-SIG-B 450, the number of symbols to encode the common block 404 and the user blocks 408 is not less than the number of encoding symbols 472.

If the number of symbols is less than the number of symbols to of the longest HE-SIG-B field, then the method 800 continues at operation 810 with encoding a duplicate portion that is to duplicate at least a portion of one or more of the common block and the number of user blocks. For example, the master station 102 may encode the HE-SIG-B fields 200, 300, 400, 500, 600, 700 in accordance with FIGS. 2-7 and the accompanying text.

The method 800 continues at operation 812 with cause the plurality of HE-SIG-A fields and the plurality of HE-SIG-B fields to be transmitted on a corresponding sub-channel of the plurality of 20 MHz sub-channels. For example, the master station 102 may operate on a bandwidth of 80 MHz and may transmit a HE-SIG-A field and a HE-SIG-B field on each of four 20 MHz sub-channels. The method 800 may end.

Figure 9:
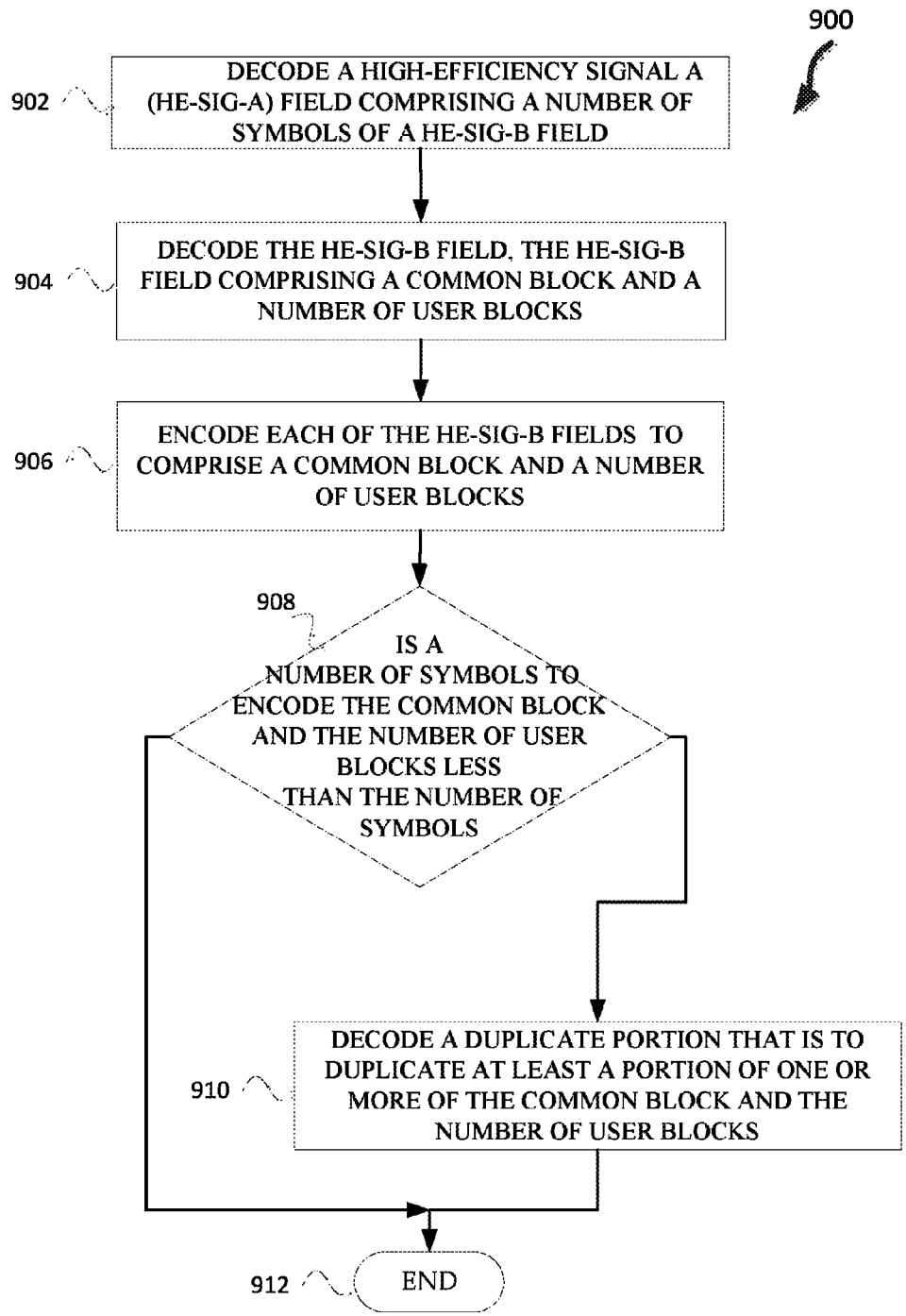
FIG. 9 illustrates a method of decoding a HE-SIG-B with padding in accordance with some embodiments.

FIG. 9 illustrates a method 900 of decoding a HE-SIG-B with padding in accordance with some embodiments. The method 900 begins at operation 900 with decoding a HE-SIG-A field comprising a number of symbols of a HE-SIG-A field. For example, the HE-SIG-A field may have a number of symbols corresponding to the number of symbols of an HE-SIG-B field 200, 300, 400, 500, 600, 700. The method 900 continues at operation 904 with decoding the HE-SIG-B field where the HE-SIG-B field comprise a common block and a number of user blocks. For example, a station 104 may decode a HE-SIG-B field 200, 300, 400, 450, 500, 600, 700 in accordance with FIGS. 2-7 and the accompanying test.

The method 900 continues at operation 908 with is a number of symbols to encode the common block and the number of user blocks less than the number of symbols. For example, the station 104 may determine that the encoding symbols 412 (FIG. 4) is less than total symbols 424. Or, alternatively, the station 104 may determine that encoding symbols 472 is not less than the total symbols 424.

If the number of symbols to encode the common block and the number of user blocks is less than the number of symbols, then the method 900 continues at operation 910 with decoding a duplicate portion that is to duplicate at least a portion of one or more of the common block and the number of user blocks. For example, the station 102 may decode the post FEC padding 410, the unused symbols 514, the unused symbols 614, or the padding portion 716 in accordance with FIGS. 4-7 and the accompanying text. The method 900 may end at operation 921.

Figure 10:
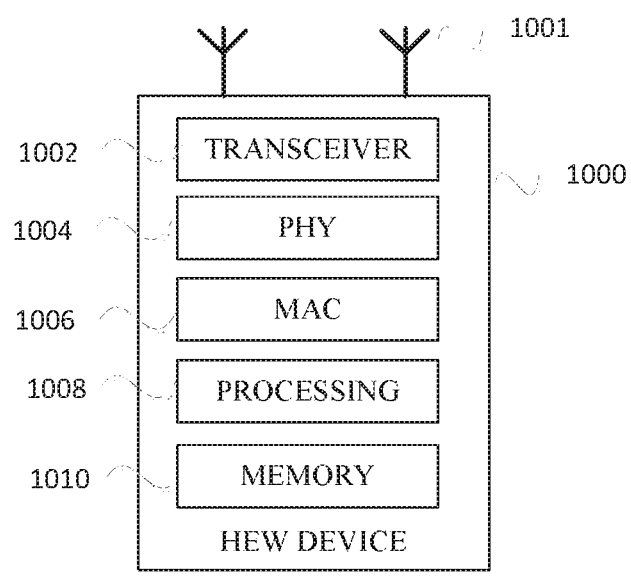
FIG. 10 illustrates a HEW device in accordance with some embodiments.

FIG. 10 illustrates a HEW device 1000 in accordance with some embodiments. HEW device 1000 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 1000 may be suitable for operating as master station 102 (FIG. 1) or a HEW STA 104 (FIG. 1). In accordance with embodiments, HEW device 1000 may include, among other things, a transmit/receive element 1001 (for example an antenna), a transceiver 1002, physical (PHY) circuitry 1004, and media access control (MAC) circuitry 1006. PHY circuitry 1004 and MAC circuitry 1006 may be HEW compliant layers and may also be compliant with one or more legacy IEEE 802.13 standards. MAC circuitry 1006 may be arranged to configure packets such as a physical layer convergence procedure (PLCP) protocol data unit (PPDUs) and arranged to transmit and receive PPDUs, among other things. HEW device 1000 may also include circuitry 1008 and memory 1010 configured to perform the various operations described herein. The circuitry 1008 may be coupled to the transceiver 1002, which may be coupled to the transmit/receive element 1001. While FIG. 10 depicts the circuitry 1008 and the transceiver 1002 as separate components, the circuitry 1008 and the transceiver 1002 may be integrated together in an electronic package or chip.

In some embodiments, the MAC circuitry 1006 may be arranged to contend for a wireless medium during a contention period to receive control of the medium for the HEW control period and configure an HEW PPDU. In some embodiments, the MAC circuitry 1006 may be arranged to contend for the wireless medium based on channel contention settings, a transmitting power level, and a CCA level.

The PHY circuitry 1004 may be arranged to transmit the HEW PPDU. The PHY circuitry 1004 may include circuitry for modulation/demodulation, upconversion/downconversion, filtering, amplification, etc. In some embodiments, the circuitry 1008 may include one or more processors. The circuitry 1008 may be configured to perform functions based on instructions being stored in a RAM or ROM, or based on special purpose circuitry. The circuitry 1008 may include processing circuitry and/or transceiver circuitry in accordance with some embodiments. The circuitry 1008 may include a processor such as a general purpose processor or special purpose processor. The circuitry 1008 may implement one or more functions associated with transmit/receive elements 1001, the transceiver 1002, the PHY circuitry 1004, the MAC circuitry 1006, and/or the memory 1010.

In some embodiments, the circuitry 1008 may be configured to perform one or more of the functions and/or methods described herein and/or in conjunction with FIGS. 1-10.

In some embodiments, the transmit/receive elements 1001 may be two or more antennas that may be coupled to the PHY circuitry 1004 and arranged for sending and receiving signals including transmission of the HEW packets. The transceiver 1002 may transmit and receive data such as HEW PPDU and packets that include an indication that the HEW device 1000 should adapt the channel contention settings according to settings included in the packet. The memory 1010 may store information for configuring the other circuitry to perform operations for configuring and transmitting HEW packets and performing the various operations to perform one or more of the functions and/or methods described herein and/or in conjunction with FIGS. 1-10.

In some embodiments, the HEW device 1000 may be configured to communicate using OFDM communication signals over a multicarrier communication channel. In some embodiments, HEW device 1000 may be configured to communicate in accordance with one or more specific communication standards, such as the Institute of Electrical and Electronics Engineers (IEEE) standards including IEEE 802.11—2012, 802.11n—2009, 802.11ac—2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 1000 may use 4× symbol duration of 802.11n or 802.11ac.

In some embodiments, an HEW device 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 1001 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 1000 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 1000 to perform the methods and/or operations described herein. The instructions may be in any suitable form, such as but not limited to source code, compiled code, interpreted code, executable code, static code, dynamic code, and the like.

Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of an access point or station. The apparatus comprising a memory, and processing circuitry coupled to the memory, wherein the processing circuitry is configured to: determine a number of symbols of a longest high-efficiency signal B (HE-SIG-B) field of a plurality of HE-SIG-B fields each to be transmitted on a 20 MHz sub-channel of a plurality of 20 MHz sub-channels; encode a plurality of high-efficiency signal A (HE-SIG-A) fields to comprise a number of symbols of a longest HE-SIG-B field of the plurality of HE-SIG-B fields each HE-SIG-A field to be transmitted on the 20 MHz sub-channel of the plurality of 20 MHz sub-channels, encode each of the HE-SIG-B fields of the plurality of HE-SIG-B fields to comprise a common block and a number of user blocks, and if a number of symbols to encode the common block and the number of user blocks is less than the number of symbols of the longest HE-SIG-B field, encode a duplicate portion that is to duplicate at least a portion of one or more of the common block and the number of user blocks; and cause the plurality of HE-SIG-A fields and the plurality of HE-SIG-B fields to be transmitted on a corresponding sub-channel of the plurality of 20 MHz sub-channels.

In Example 2, the subject matter of Example 1 can optionally include where each duplicate portion is to comprise a duplicate of the common block that either starts or ends at the end of the HE-SIG-B field.

In Example 3, the subject matter of Examples 1 or 2 can optionally include where the common block comprises a resource allocation of the corresponding 20 MHz sub-channel of the plurality of 20 MHz sub-channels for one or more stations.

In Example 4, the subject matter of Example 3 can optionally include where each user block comprises a modulation and coding scheme for each of the one or more stations to use to decode data to be transmitted in accordance with the corresponding resource allocation.

In Example 5, the subject matter of any Examples 1-4 can optionally include where the duplicate portion is to comprise the common block and at least one of the number of user blocks.

In Example 6, the subject matter of any of Examples 1-5 can optionally include where the processing circuitry is further configured to: encode each of the number of user blocks to comprise a user block portion of one or more resource allocations for one or more stations and a forward error correction (FEC) portion for the user block portion, and wherein the user block portion and the FEC portion are to be encoded together into a code word.

In Example 7, the subject matter of any of Examples 1-6 can optionally include where the processing circuitry is further configured to: encode the duplicate portion to encode a portion of a symbol with the portion of one or more of the common block or the number of user blocks.

In Example 8, the subject matter of any Examples 1-7 can optionally include where the processing circuitry is further configured to: encode a plurality of data frames in accordance with a corresponding common block and a corresponding user block of the number of user blocks; and cause the plurality of data frames to be transmitted in accordance with the resource allocations of the number of user blocks and on the corresponding sub-channel of the plurality of sub-channels in accordance with orthogonal frequency division multiple-access (OFDMA).

In Example 9, the subject matter of any Examples 1-8 can optionally include where the processing circuitry is further configured to: encode the duplicate portion that is to duplicate at least the portion of one or more of the common block and the number of user blocks to extend to an end of the number of symbols of the longest HE-SIG-B field.

In Example 10, the subject matter of any Examples 1-9 can optionally include where the access point or station is one from the following group: an access point, an Institute of Electrical and Electronic Engineers (IEEE) 802.11ax access point, an IEEE 802.11ax station, and a station.

In Example 11, the subject matter of any Examples 1-10 can optionally include one or more antennas coupled to the processing circuitry.

In Example 12, the subject matter of Example 11 can optionally include where the processing circuitry is further configured to: transmit the plurality of HE-SIG-A fields and the plurality of HE-SIG-B fields on the corresponding sub-channel of the plurality of 20 MHz sub-channels in accordance with orthogonal frequency division multiple-access (OFDMA).

Example 13 is a non-transitory computer-readable storage medium that stores instructions for execution by one or more processors. The instructions to configure the one or more processors to cause an access point or station to: determine a number of symbols of a longest high-efficiency signal B (HE-SIG-B) field of a plurality of HE-SIG-B fields each to be transmitted on a 20 MHz sub-channel of a plurality of 20 MHz sub-channels, encode a plurality of high-efficiency signal A (HE-SIG-A) fields to comprise a number of symbols of a longest HE-SIG-B field of the plurality of HE-SIG-B fields each HE-SIG-A field to be transmitted on the 20 MHz sub-channel of the plurality of 20 MHz sub-channels; encode each of the HE-SIG-B fields of the plurality of HE-SIG-B fields to comprise a common block and a number of user blocks, and if a number of symbols to encode the common block and the number of user blocks is less than the number of symbols of the longest HE-SIG-B field, encode a duplicate portion that is to duplicate at least a portion of one or more of the common block and the number of user blocks; and cause the plurality of HE-SIG-A fields and the plurality of HE-SIG-B fields to be transmitted on a corresponding sub-channel of the plurality of 20 MHz sub-channels.

In Example 14, the subject matter of Example 14 can optionally include where each duplicate portion is to comprise a duplicate of the common block that either starts or ends at the end of the HE-SIG-B field.

In Example 15, the subject matter of Examples 13 or 14 can optionally include where the common block comprises a resource allocation of the corresponding 20 MHz sub-channel of the plurality of 20 MHz sub-channels for one or more stations.

In Example 16, the subject matter of Example 15 can optionally include where each user blocks comprises a modulation and coding scheme for each of the one or more stations to use to decode data to be transmitted in accordance with the corresponding resource allocation.

In Example 17, the subject matter of any Examples 13-16 can optionally include where the instructions cause the access point or the station: encode each of the number of user blocks to comprise a user block portion of one or more resource allocations for one or more stations and a forward error correction (FEC) portion for the user block portion, and wherein the user block portion and the FEC portion are to be encoded together into a code word.

Example 18 is a method performed by an access point or station, the method comprising: determining a number of symbols of a longest high-efficiency signal B (HE-SIG-B) field of a plurality of HE-SIG-B fields each to be transmitted on a 20 MHz sub-channel of a plurality of 20 MHz sub-channels; encoding a plurality of high-efficiency signal A (HE-SIG-A) fields to comprise a number of symbols of a longest HE-SIG-B field of the plurality of HE-SIG-B fields each HE-SIG-A field to be transmitted on the 20 MHz sub-channel of the plurality of 20 MHz sub-channels; encoding each of the HE-SIG-B fields of the plurality of HE-SIG-B fields to comprise a common block and a number of user blocks, and if a number of symbols to encode the common block and the number of user blocks is less than the number of symbols of the longest HE-SIG-B field, encode a duplicate portion that is to duplicate at least a portion of one or more of the common block and the number of user blocks; and causing the plurality of HE-SIG-A fields and the plurality of HE-SIG-B fields to be transmitted on a corresponding sub-channel of the plurality of 20 MHz sub-channels.

In Example 19, the subject matter of Example 18 can optionally include where each duplicate portion is to comprise a duplicate of the common block that either starts or ends at the end of the HE-SIG-B field.

In Example 20, the subject matter of Examples 18 or 19 can optionally include where each user blocks comprises a resource allocation of the corresponding 20 MHz sub-channel of the plurality of 20 MHz sub-channels for one or more stations.

Example 21 is an apparatus of an access point or station. The apparatus comprising a memory, and processing circuitry coupled to the memory, wherein the processing circuitry is configured to: decode a high-efficiency signal A (HE-SIG-A) field comprising a number of symbols of a HE-SIG-B field; and decode the HE-SIG-B field, the HE-SIG-B field comprising a common block and a number of user blocks, and if a number of symbols to encode the common block and the number of user blocks is less than the number of symbols, decode a duplicate portion that is to duplicate at least a portion of one or more of the common block and the number of user blocks.

In Example 22, the subject matter of Example 21 can optionally include where the processing circuitry is further configured to: determine a resource allocation for the wireless device based on the common block and the number of user blocks; and decode data in accordance with the resource allocation.

In Example 23, the subject matter of Examples 21 or 22 can optionally include where the processing circuitry is further configured to: if the decode of the common block fails, then decode a duplicated common block from the duplicated portion.

In Example 24, the subject matter of any Examples 21-23 can optionally include where the processing circuitry is further configured to: combine the bits of the duplicate portion with the corresponding bits of the common block and the number of user blocks to decode the common block and the number of user blocks.

In Example 25, the subject matter of any Examples 21-24 can optionally include one or more antennas coupled to the processing circuitry.

Example 26 is an apparatus of an access point or station. The apparatus comprising: means for determining a number of symbols of a longest high-efficiency signal B (HE-SIG-B) field of a plurality of HE-SIG-B fields each to be transmitted on a 20 MHz sub-channel of a plurality of 20 MHz sub-channels; means for encoding a plurality of high-efficiency signal A (HE-SIG-A) fields to comprise a number of symbols of a longest HE-SIG-B field of the plurality of HE-SIG-B fields each HE-SIG-A field to be transmitted on the 20 MHz sub-channel of the plurality of 20 MHz sub-channels; means for encoding each of the HE-SIG-B fields of the plurality of HE-SIG-B fields to comprise a common block and a number of user blocks, and if a number of symbols to encode the common block and the number of user blocks is less than the number of symbols of the longest HE-SIG-B field, encode a duplicate portion that is to duplicate at least a portion of one or more of the common block and the number of user blocks; and means for causing the plurality of HE-SIG-A fields and the plurality of HE-SIG-B fields to be transmitted on a corresponding sub-channel of the plurality of 20 MHz sub-channels.

In Example 27, the subject matter of Example 26 can optionally include where each duplicate portion is to comprise a duplicate of the common block that either starts or ends at the end of the HE-SIG-B field.

In Example 28, the subject matter of Examples 26 or 27 can optionally include where the common block comprises a resource allocation of the corresponding 20 MHz sub-channel of the plurality of 20 MHz sub-channels for one or more stations.

In Example 29, the subject matter of Example 28 can optionally include where each user block comprises a modulation and coding scheme for each of the one or more stations to use to decode data to be transmitted in accordance with the corresponding resource allocation.

In Example 30, the subject matter of Examples 26-29 can optionally include where the duplicate portion is to comprise the common block and at least one of the number of user blocks.

In Example 31, the subject matter of any Examples 26-30 can optionally include means for encoding each of the number of user blocks to comprise a user block portion of one or more resource allocations for one or more stations and a forward error correction (FEC) portion for the user block portion, and wherein the user block portion and the FEC portion are to be encoded together into a code word.

In Example 32, the subject matter of any Examples 26-31 can optionally include means for encoding the duplicate portion to encode a portion of a symbol with the portion of one or more of the common block or the number of user blocks.

In Example 33, the subject matter of any Examples 26-32 can optionally include means for encoding a plurality of data frames in accordance with a corresponding common block and a corresponding user block of the number of user blocks; and means for causing the plurality of data frames to be transmitted in accordance with the resource allocations of the number of user blocks and on the corresponding sub-channel of the plurality of sub-channels in accordance with orthogonal frequency division multiple-access (OFDMA).

In Example 34, the subject matter of any Examples 26-33 can optionally include means for encoding the duplicate portion that is to duplicate at least the portion of one or more of the common block and the number of user blocks to extend to an end of the number of symbols of the longest HE-SIG-B field.

In Example 35, the subject matter of any Examples 26-34 can optionally include where the access point or station is one from the following group: an access point, an Institute of Electrical and Electronic Engineers (IEEE) 802.11ax access point, an IEEE 802.11ax station, and a station.

In Example 36, the subject matter of any of Examples 26-35 can optionally include means for transmitting and receiving radio signals in accordance with Institute of Electrical and Electronic Engineers (IEEE) 802.11.

In Example 37, the subject matter of Example 36 can optionally include means for transmitting the plurality of HE-SIG-A fields and the plurality of HE-SIG-B fields on the corresponding sub-channel of the plurality of 20 MHz sub-channels in accordance with orthogonal frequency division multiple-access (OFDMA).

Example 38 is an apparatus of an access point or station, the apparatus comprising: means for decoding a high-efficiency signal A (HE-SIG-A) field comprising a number of symbols of a HE-SIG-B field; and means for decoding the HE-SIG-B field, the HE-SIG-B field comprising a common block and a number of user blocks, and if a number of symbols to encode the common block and the number of user blocks is less than the number of symbols, decode a duplicate portion that is to duplicate at least a portion of one or more of the common block and the number of user blocks.

In Example 39, the subject matter of Example 38 can optionally include means for determining a resource allocation for the wireless device based on the common block and the number of user blocks; and means for decoding data in accordance with the resource allocation.

In Example 40, the subject matter of Examples 38 or 39 can optionally include if the decode of the common block fails, then means for decoding a duplicated common block from the duplicated portion.

In Example 41, the subject matter of Example 40 can optionally include means for combining the bits of the duplicate portion with the corresponding bits of the common block and the number of user blocks to decode the common block and the number of user blocks.

In Example 42, the subject matter of any of Examples 38-42 can optionally include means for transmitting and receiving radio waves.

Example 43 is a method performed by an access point or station. The method comprising: decoding a high-efficiency signal A (HE-SIG-A) field comprising a number of symbols of a HE-SIG-B field; and decoding the HE-SIG-B field, the HE-SIG-B field comprising a common block and a number of user blocks, and if a number of symbols to encode the common block and the number of user blocks is less than the number of symbols, decode a duplicate portion that is to duplicate at least a portion of one or more of the common block and the number of user blocks.

In Example 44, the subject matter of Example 44 can optionally include determining a resource allocation for the wireless device based on the common block and the number of user blocks; and decoding data in accordance with the resource allocation.

In Example 45, the subject matter of Examples 43 or 44 can optionally include if the decode of the common block fails, then decoding a duplicated common block from the duplicated portion.

In Example 46, the subject matter of any of Examples 43-45 can optionally include combining the bits of the duplicate portion with the corresponding bits of the common block and the number of user blocks to decode the common block and the number of user blocks.

Example 47 is a non-transitory computer-readable storage medium that stores instructions for execution by one or more processors. The instructions to configure the one or more processors to cause an access point or station to: decode a high-efficiency signal A (HE-SIG-A) field comprising a number of symbols of a HE-SIG-B field; and decode the HE-SIG-B field, the HE-SIG-B field comprising a common block and a number of user blocks, and if a number of symbols to encode the common block and the number of user blocks is less than the number of symbols, decode a duplicate portion that is to duplicate at least a portion of one or more of the common block and the number of user blocks.

In Example 48, the subject matter of Example 48 can optionally include where the instructions cause the access point or the station: determine a resource allocation for the wireless device based on the common block and the number of user blocks; and decode data in accordance with the resource allocation.

In Example 49, the subject matter of Examples 47 and 48 can optionally include where the instructions cause the access point or the station: if the decode of the common block fails, then decode a duplicated common block from the duplicated portion.

In Example 50, the subject matter of any of Examples 47-49 can optionally include where the instructions cause the access point or the station: combine the bits of the duplicate portion with the corresponding bits of the common block and the number of user blocks to decode the common block and the number of user blocks.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point or station, the apparatus comprising: a memory, and processing circuitry coupled to the memory, wherein the processing circuitry is configured to:
   determine a number of symbols of a longest high-efficiency signal B (HE-SIG-B) field of a plurality of HE-SIG-B fields each to be transmitted on a 20 MHz sub-channel of a plurality of 20 MHz sub-channels;
   encode a plurality of high-efficiency signal A (HE-SIG-A) fields to comprise a number of symbols of a longest HE-SIG-B field of the plurality of HE-SIG-B fields each HE-SIG-A field to be transmitted on the 20 MHz sub-channel of the plurality of 20 MHz sub-channels;
   encode each of the HE-SIG-B fields of the plurality of HE-SIG-B fields to comprise a common block and a number of user blocks, and if a number of symbols to encode the common block and the number of user blocks is less than the number of symbols of the longest HE-SIG-B field, encode a duplicate portion that is to duplicate at least a portion of one or more of the common block and the number of user blocks; and
   cause the plurality of HE-SIG-A fields and the plurality of HE-SIG-B fields to be transmitted on a corresponding sub-channel of the plurality of 20 MHz sub-channels.

2. The apparatus of claim 1, wherein each duplicate portion is to comprise a duplicate of the common block that either starts or ends at the end of the HE-SIG-B field.

3. The apparatus of claim 1, wherein the common block comprises a resource allocation of the corresponding 20 MHz sub-channel of the plurality of 20 MHz sub-channels for one or more stations.

4. The apparatus of claim 3, wherein each user block of the number of user blocks comprises a modulation and coding scheme for each of the one or more stations to use to decode data to be transmitted in accordance with a corresponding resource allocation.

5. The apparatus of claim 1, wherein the duplicate portion is to comprise the common block and at least one of the number of user blocks.

6. The apparatus of claim 1, wherein the processing circuitry is further configured to:
encode each of the number of user blocks to comprise a user block portion of one or more resource allocations for one or more stations and a forward error correction (FEC) portion for the user block portion, and wherein the user block portion and the FEC portion are to be encoded together into a code word.

7. The apparatus of claim 1, wherein the processing circuitry is further configured to:
encode the duplicate portion to encode a portion of a symbol with the portion of one or more of the common block or the number of user blocks.

8. The apparatus of claim 1, wherein the processing circuitry is further configured to:
encode a plurality of data frames in accordance with a corresponding common block and a corresponding user block of the number of user blocks; and
cause the plurality of data frames to be transmitted in accordance with resource allocations indicated by the number of user blocks and the corresponding common block, and on the 20 MHz sub-channel of the plurality of sub-channels in accordance with orthogonal frequency division multiple-access (OFDMA).

9. The apparatus of claim 1, wherein the processing circuitry is further configured to:
encode the duplicate portion that is to duplicate at least the portion of one or more of the common block and the number of user blocks to extend to an end of the number of symbols of the longest HE-SIG-B field.

10. The apparatus of claim 1, wherein the access point or station is one from the following group: an access point, an Institute of Electrical and Electronic Engineers (IEEE) 802.11ax access point, an IEEE 802.11ax station, and a station.

11. The apparatus of claim 1, further comprising one or more antennas coupled to the processing circuitry.

12. The apparatus of claim 11, wherein the processing circuitry is further configured to:
transmit the plurality of HE-SIG-A fields and the plurality of HE-SIG-B fields on the corresponding sub-channel of the plurality of 20 MHz sub-channels in accordance with orthogonal frequency division multiple-access (OFDMA).

13. A non-transitory computer-readable storage medium that stores instructions for execution by one or more processors, the instructions to configure the one or more processors to cause an access point or station to:
determine a number of symbols of a longest high-efficiency signal B (HE-SIG-B) field of a plurality of HE-SIG-B fields each to be transmitted on a 20 MHz sub-channel of a plurality of 20 MHz sub-channels;
encode a plurality of high-efficiency signal A (HE-SIG-A) fields to comprise a number of symbols of a longest HE-SIG-B field of the plurality of HE-SIG-B fields each HE-SIG-A field to be transmitted on the 20 MHz sub-channel of the plurality of 20 MHz sub-channels;
encode each of the HE-SIG-B fields of the plurality of HE-SIG-B fields to comprise a common block and a number of user blocks, and if a number of symbols to encode the common block and the number of user blocks is less than the number of symbols of the longest HE-SIG-B field, encode a duplicate portion that is to duplicate at least a portion of one or more of the common block and the number of user blocks; and
cause the plurality of HE-SIG-A fields and the plurality of HE-SIG-B fields to be transmitted on a corresponding sub-channel of the plurality of 20 MHz sub-channels.

14. The non-transitory computer-readable storage medium of claim 13, wherein each duplicate portion is to comprise a duplicate of the common block that either starts or ends at the end of the HE-SIG-B field.

15. The non-transitory computer-readable storage medium of claim 13, wherein the common block comprises a resource allocation of the corresponding 20 MHz sub-channel of the plurality of 20 MHz sub-channels for one or more stations.

16. The non-transitory computer-readable storage medium of claim 15, wherein each user block of the number of user blocks comprises a modulation and coding scheme for each of the one or more stations to use to decode data to be transmitted in accordance with a corresponding resource allocation.

17. The non-transitory computer-readable storage medium of claim 13, wherein the instructions cause the access point or the station:
encode each of the number of user blocks to comprise a user block portion of one or more resource allocations for one or more stations and a forward error correction (FEC) portion for the user block portion, and wherein the user block portion and the FEC portion are to be encoded together into a code word.

18. A method performed by an access point or station, the method comprising:
determining a number of symbols of a longest high-efficiency signal B (HE-SIG-B) field of a plurality of HE-SIG-B fields each to be transmitted on a 20 MHz sub-channel of a plurality of 20 MHz sub-channels;
encoding a plurality of high-efficiency signal A (HE-SIG-A) fields to comprise a number of symbols of a longest HE-SIG-B field of the plurality of HE-SIG-B fields each HE-SIG-A field to be transmitted on the 20 MHz sub-channel of the plurality of 20 MHz sub-channels;
encoding each of the HE-SIG-B fields of the plurality of HE-SIG-B fields to comprise a common block and a number of user blocks, and if a number of symbols to encode the common block and the number of user blocks is less than the number of symbols of the longest HE-SIG-B field, encode a duplicate portion that is to duplicate at least a portion of one or more of the common block and the number of user blocks; and
causing the plurality of HE-SIG-A fields and the plurality of HE-SIG-B fields to be transmitted on a corresponding sub-channel of the plurality of 20 MHz sub-channels.

19. The method of claim 18, wherein each duplicate portion is to comprise a duplicate of the common block that either starts or ends at the end of the HE-SIG-B field.

20. The method of claim 18, wherein each user blocks comprises a resource allocation of the corresponding 20 MHz sub-channel of the plurality of 20 MHz sub-channels for one or more stations.

* * * * *